March 22, 1949.  A. T. GORMAN  2,464,977
FLUID PRESSURE BRAKE APPARATUS
Filed Nov. 13, 1947  2 Sheets-Sheet 1

INVENTOR.
Andrew T. Gorman
BY
Frank E. Miller.
ATTORNEY

March 22, 1949. A. T. GORMAN 2,464,977

FLUID PRESSURE BRAKE APPARATUS

Filed Nov. 13, 1947 2 Sheets-Sheet 2

FIG. 4

INVENTOR.
ANDREW T. GORMAN
BY
Frank E. Miller,
ATTORNEY

Patented Mar. 22, 1949

2,464,977

UNITED STATES PATENT OFFICE 2,464,977

FLUID PRESSURE BRAKE APPARATUS

Andrew T. Gorman, Pitcairn, Pa., assignor to The Westinghouse Air Brake Company, Wilmerding, Pa., a corporation of Pennsylvania Application November 13, 1947, Serial No. 785,588

10 Claims. (Cl. 303—26)

This invention relates to fluid pressure brake apparatus and more particularly to the type for use on railroad locomotives.

In U. S. Patent 2,173,940 issued on September 26, 1939, to E. E. Hewitt et al., there is disclosed a locomotive brake equipment embodying an engineer's automatic brake valve device for controlling the brakes on the locomotive and cars of a train either on the straight air principal through the medium of train wires and magnet valve devices on the locomotive and each car of the train or on the usual automatic principal through the medium of a brake pipe and pneumatic brake controlling valve devices on the locomotive and on each car of the train. An independent brake valve device is also provided on the locomotive for controlling the brakes on the locomotive independently of the brakes on the train through the medium of an interlock valve device associated with the brake controlling valve device on the locomotive.

The interlock valve device comprises two double check valves for selectively closing the automatic, straight air and independent brake control communications to a fluid pressure relay valve device which is operative to regulate the brake applying pressure of fluid in the usual locomotive brake cylinder device according to the controlling pressure in the effective one of said communications. The interlock valve device further comprises an independent release valve for releasing to atmosphere fluid under pressure from the fluid pressure relay valve device to release the locomotive brakes or to prevent an application thereof, and a selector valve device controlled by and cooperative with the engineer's independent brake valve device for controlling said release valve device.

The release valve device is in the form of a valve piston arranged to cooperate with an annular seat on one side for controlling the fluid pressure release communication from the fluid pressure relay valve device to atmosphere. When the release valve piston is seated the area of the seated side around the seat is open to the fluid pressure relay valve device while that within said seat is open to atmosphere. When unseated the full area of the one side of the release valve piston is subject to pressure of fluid from the fluid pressure relay valve device. At the opposite side of the release valve piston is a control chamber containing a spring for urging the valve to its seat. A small charging port through the release valve piston constantly connects the control chamber at the one side to the opposite side outside of the annular seat. While not disclosed in the above mentioned patent, the commercial structure is also provided with another charging communication for the control chamber in the form of a plurality of by-pass grooves for connecting said chamber to the outside of the annular seat at the opposite side of the valve piston when the valve piston is seated. This other communication through the by-pass grooves is however closed immediately upon movement of the release valve piston from its seat.

The selector valve device is controlled through an actuating pipe from the independent brake valve device for controlling communication between the control chamber at the one side of the release valve piston and an application and release pipe extending from end to end of the locomotive for connection with a corresponding pipe on a connected locomotive or locomotive unit when coupled therewith. The application and release pipe is also connected to the independent brake valve device on the respective locomotive.

The independent brake valve device comprises a handle having two planes of movement. In an elevated plane fluid under pressure is released from the actuating pipe to effect movement of the selector valve device to a normal position for closing communication between the control chamber at the one side of the release valve piston and the application and release pipe to permit prompt equalization of fluid pressures at opposite sides of said piston to hold it seated while the automatic brake valve device is operated to effect either an automatic or an electro-pneumatic straight air application of brakes, so that the locomotive brakes will operate in harmony with those on a connected train. Also in this plane of movement the locomotive brakes may, if desired, be applied and released independently of the train brakes when the train brakes are released.

In the depressed plane of movement of the independent brake valve handle fluid under pressure is supplied to the actuating pipe to effect operation of the selector valve device to a release position for connecting the control chamber at the one side of the release valve piston to the application and release pipe, and in this plane of movement the handle has a release position for opening said pipe to atmosphere and a locking position for closing communication between said pipe and atmosphere. The release position, in which the application and release pipe and control chamber at the one side of the release valve piston are open to atmosphere, is provided for releasing from said control chamber fluid under pressure supplied thereto from the opposite side of the release valve piston through the charging port and/or by-pass grooves, after an application of brakes has been effected, or during the time fluid under pressure is being supplied to the fluid pressure relay valve device, to cause opening of said release valve piston for releasing fluid under pressure from the fluid pressure relay valve device for in turn releasing, independently of the train brakes, a brake application already effected on the locomotive, or for preventing an application of the locomotive brakes while the train brakes are being applied.

The locking position of the independent brake valve handle is provided for preventing a straight air application of the locomotive brakes, but not an automatic application, upon operation of the automatic brake valve device to apply the brakes on the train. To accomplish this the selector valve when it operates in response to depression of the independent brake valve handle intercepts the straight air control communication through which a straight air application of brakes on the locomotive is effected, while the control chamber at the one side of the release valve piston is merely open to the application and release pipe which is closed at the independent brake valve device, so that in case of an automatic application, fluid under pressure supplied to operate the fluid pressure relay valve device will equalize into said chamber and pipe and hold the release valve piston seated to permit the locomotive brakes to be applied.

When several locomotives or locomotive units are coupled together for double or multiple heading, the application and release pipe and the actuating pipe are both connected therebetween, and on each locomotive or unit, except that selected for control, a double heading cock is operated to close communication from the respective application and release, and actuating pipes to the respective independent brake valve device. On all of the connected locomotives or units the control chamber at the one side of the release valve piston is open through the connected application and release pipe to the independent brake valve device on the control locomotive, and also the selector valve devices on the several locomotives or units are likewise opened through the connected actuating pipes to the independent brake valve device on the control unit. With this arrangement it is impossible, in an acceptable manner, to either prevent the brakes on the locomotive or units thereof applying while applying the train brakes automatically, or to effect a release of brakes on the locomotives after an application thereof in unison with an application of brakes on the cars of a train.

More specifically, if the engineer on the control locomotive or unit desires to prevent the brakes on the locomotives or units thereof from applying at the time the automatic brake valve device is operated to effect an automatic application of brakes on the train he will depress the handle of the independent brake valve device to effect on each of the several locomotives or units, operation of the selector valve device to its release position for opening the control chamber at the one side of the release valve piston to the application and release pipe, the connected application and release pipes on the several locomotive units being open to atmosphere at this time through the independent brake valve device on the control locomotive or unit. The operation of the brake controlling valve device on each of the several locomotive units, in response to operation of the automatic brake valve device, will supply fluid under pressure to the respective fluid pressure relay valve device and the seated side of the release valve piston. This supply will initially be very rapid, as a result of which, it will promptly move the release valve piston against the opposing pressure of the spring in the control chamber and thereby start releasing fluid under pressure being supplied to the fluid pressure relay valve device for preventing operation thereof to apply the locomotive brakes, as desired. However, at the same time, fluid under pressure will flow from the unseated side of the release valve piston to the control chamber at the opposite side, this occurring on each locomotive, due to which, and to the long application and release pipe connected through the several units and which is open to atmosphere only at the control locomotive, the pressure of fluid in the several control chambers will build up sufficiently to permit the spring therein to seat the release valve piston. This closing of the release valve pistons will open the by-pass grooves and provide even greater flow to the control chambers and to the application and release pipes and maintain a pressure therein sufficient to prevent reopening of the release valve pistons, with the result that the locomotive brakes will apply when it is not desired.

On the other hand, if the locomotive brakes have been applied along with those on the train, under which condition, on each locomotive the control chamber at the one side of the release valve piston and the passage connecting said chamber to the selector valve device will be fully charged with fluid from the fluid pressure relay valve device, and the engineer desires to release the locomotive brakes independently of those on the train, he will depress the independent brake valve handle to cause operation of the selector valve devices to their release position for opening the several control chambers to the respective application and release pipes which are connected together and open to atmosphere only at the independent brake valve device on the control locomotive. The pressure of fluid in the several control chambers will then suddenly reduce into the application and release pipes and permit unseating of the respective release valve pistons for releasing fluid under pressure from the respective fluid pressure relay valve devices for initiating the release of the brakes on the respective locomotive. However, with the release valve pistons unseated fluid under pressure will flow through the ports therein into the control chambers, and due to the resistance to dissipation of fluid under pressure therefrom through the application and release pipes and the single independent brake valve device on the control unit, sufficient pressure will be obtained in said control chambers to reseat the release valve pistons and thus hold on the several locomotives a partial application of the brakes, which is not desired.

In either of the above cases, the locomotive brakes can however be fully released by pumping the handle of the independent brake valve device on the control locomotive between its elevated and depressed positions. The handle will be depressed until the release valve pistons seat as above described and then allowed to return to its elevated plane of movement to effect operation of the several selector valve devices to disconnect the respective control chambers from the application and release pipes. The application and release pipes will then become completely vented through the independent brake valve device following which the independent brake valve handle can be depressed again to cause local venting of the control chambers to the vented auxiliary application and release pipes for effecting another release of fluid from the brake cylinders on the locomotive units. When the release valve pistons then reseat as above described, the independent brake valve handle can again be allowed to return to its elevated position for completely releasing the application and release pipes, and then again depressed for effecting a still further release of fluid under pressure from the control chambers and thereby from the locomotive brake cylinders. By continuing this pumping movement of the independent brake valve handle the locomotive brakes can be released, but effecting a release in this manner requires time and permits the locomotive brakes to be on when not intended, and therefore is not desirable.

The principal object of the invention is therefore the provision of an improved interlock valve device arranged to be associated with the brake controlling valve device on the locomotive for obviating the above difficulty.

According to this object the improved interlock valve device embodies a positively operative local release valve device in place of the independent release valve piston above described, and a different selector valve device, the parts being so designed and arranged that under all conditions of operation, as controlled by the independent brake valve device on the respective locomotive, or on another locomotive in case of double or multiple heading, an application of locomotive brakes will be positively prevented when an application is not desired, and a complete release of an application will be promptly obtained whenever that is desired.

Other objects and advantages of the invention will become apparent from the following more detailed description thereof.

In the accompanying drawing.

*Description*

Figures 1, 2, 3:
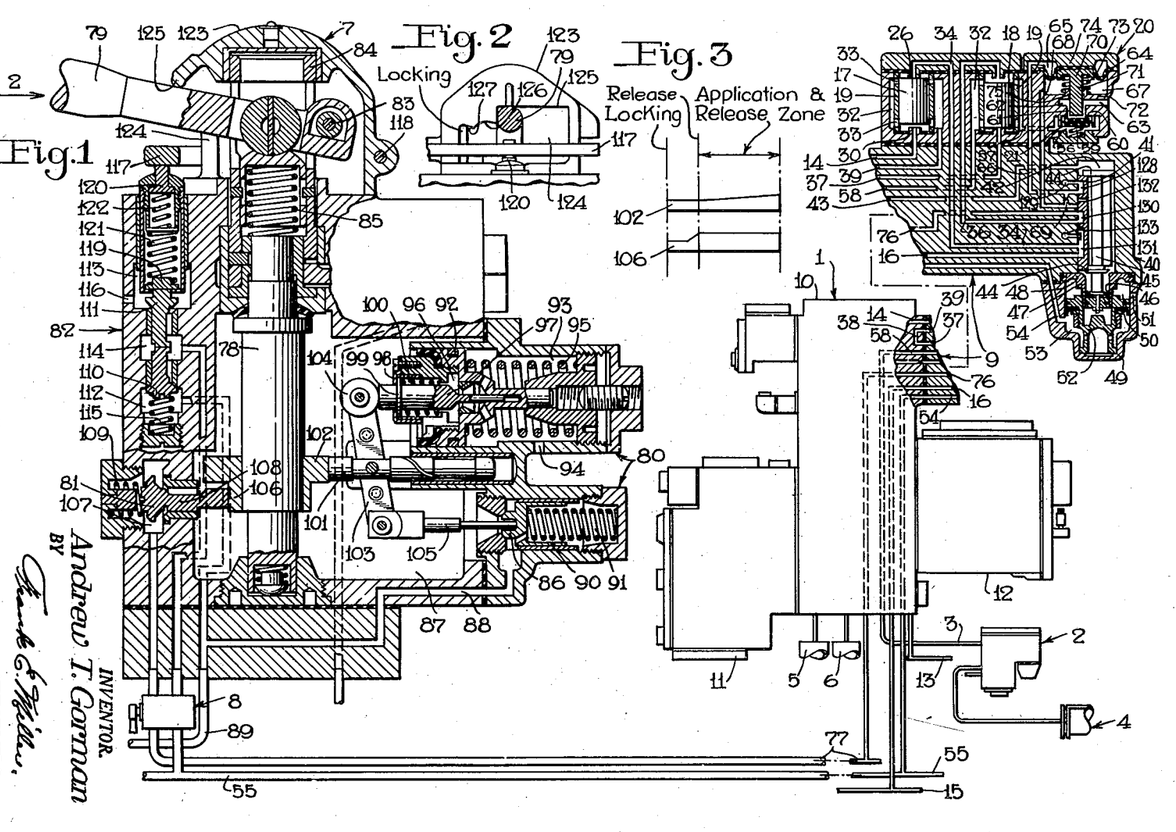
Fig. 1 is a diagrammatic view of a portion of a locomotive brake equipment embodying a preferred form of the invention.
Fig. 2 is a side elevational view of a portion of an operator's independent brake valve device shown in section in Fig. 1 and looking in the direction of the arrow 2 in Fig. 1.
Fig. 3 is a diagrammatic development view of two cams contained in and arranged in projected relation to various operating positions of the handle in said brake valve device.
Figure 4:
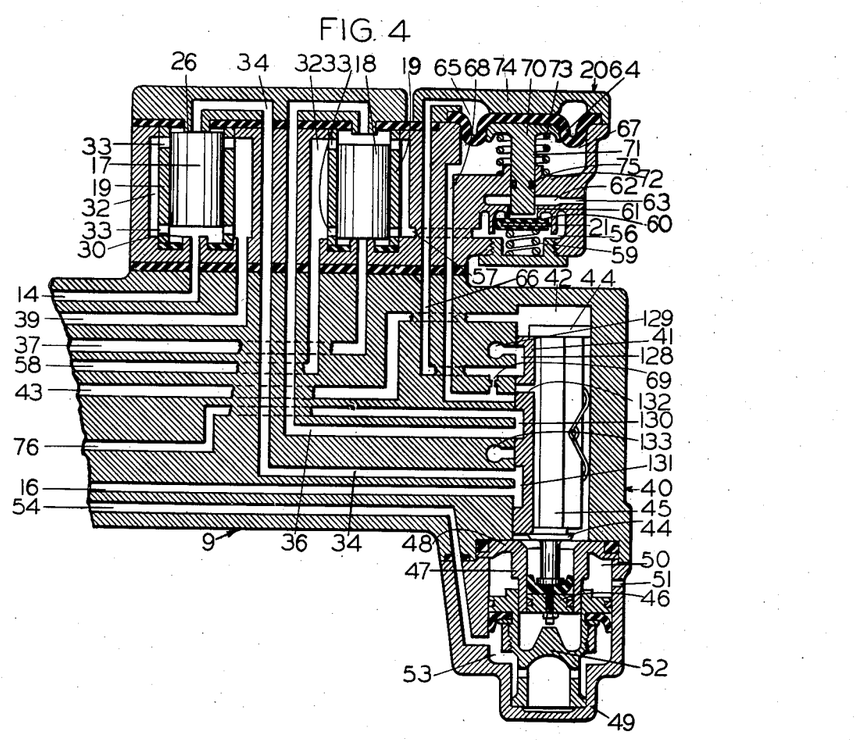
Fig. 4 is an enlargement of a sectional view of a portion of a brake controlling valve device shown in Fig. 1.

As shown in the drawing, locomotive brake equipment comprises a brake controlling valve device 1, a fluid pressure relay valve device 2 arranged to be controlled by pressure of fluid in a control pipe 3 for providing fluid at a corresponding pressure in the brake cylinder device 4, an auxiliary reservoir 5, an emergency reservoir 6, an engineer's independent brake valve device 7 and a double heading cock 8. All of these structures may be identical to corresponding parts fully disclosed in the Hewitt et al. patent above referred to, with the exception of an interlock valve device 9 forming a part of the brake controlling valve device and which embodies the invention.

The brake controlling valve device 1 comprises a pipe bracket 10 upon one face of which is mounted a service application valve device 11, while on another face is mounted an emergency valve device 12 along with the interlock valve device 9. Reference numeral 13 designates the usual brake pipe adapted to extend from end to end of the locomotive for connection with the brake pipe on a connected locomotive or locomotive units and with the brake pipe on a train and the pressure in which is arranged to be controlled by operation of an engineer's automatic brake valve device, not shown in the present application. The service application valve device 11 is adapted to operate in the usual manner upon a service reduction in pressure in brake pipe 13 for supplying fluid under pressure from the auxiliary reservoir 5 to an application passage 14 in the interlock valve device 9 for effecting a service application of brakes in a manner which will be more fully explained hereinafter. Upon an emergency reduction in pressure in the brake pipe 13 the service application valve device 11 and emergency valve device 12 are both adapted to operate in the usual manner to supply fluid under pressure from the auxiliary and emergency reservoirs 5 and 6 to the application passage 14 for effecting an emergency application of brakes. Upon recharging of brake pipe 13 to its normal pressure, following either a service or an emergency application of brakes, the service application valve device 11 and emergency valve device 12 are adapted to return to normal position in which the application passage 14 will be vented to atmosphere.

The reference numeral 15 designates a straight air pipe adapted to extend from end to end of the locomotive for connection with the corresponding pipe on a connected locomotive and/or cars of a train. The straight air pipe 15 is connected to a straight air application and release passage 16 in the interlock valve device 9 and the locomotive brakes will be applied and released in accordance with variations in pressures in said pipe, in a manner to be later described.

The interlock valve device 9 comprises two like double check valves 17 and 18 each slidably mounted in a bushing 19 secured in the casing. The double check valves 17 and 18 may be like those disclosed in U. S. Patent 2,311,851 issued on February 23, 1943, to G. T. McClure, but for the purpose of illustration are shown in the form of solid cylinders.

The casing is provided with an annular cavity 32 encircling each bushing 19 and each bushing adjacent its opposite ends is provided with a plurality of through radial ports 33.

The double check valve 17 is arranged to control communication between the respective annular cavity 32 and the automatic application passage 14 opening through a seat 30 to one end thereof and a passage 34 opening through a seat 26 to its opposite end. When fluid under pressure is supplied to passage 14 such pressure acting on the check valve 17 is adapted to shift said check valve to the position shown in the drawing to close communication between the respective annular cavity 32 and passage 34 and for opening said cavity to passage 14 through the ports 33 at the lower end of the respective bushing 18. When fluid under pressure is supplied to passage 34 such pressure is adapted to shift check valve 17 into contact with the seat 30 to close communication between the respective annular cavity 32 and the automatic passage 14 and for opening said cavity to the passage 34.

The double check valve 18 operates in a like manner to control communication between the respective annular cavity 32 and passages 36 and 37, passage 37 being permanently connected through a passage 38 in the pipe bracket 1 and a passage 39 to the annular cavity 32 in the double check valve device 17.

The interlock valve device 9 further comprises a selector valve device 40 comprising a slide valve 41 which is contained in a chamber 42 adapted to be constantly supplied with fluid under pressure from the usual main reservoir on the locomotive through a passage 43. The slide valve 41 is mounted between two spaced shoulders 44 provided on an operating stem 45 to one end of which is connected a piston 46 subject to pressure of fluid in chamber 42 for urging said slide valve in the direction of said piston to the position in which it is shown in the drawing.

The piston 46 is slidably mounted interiorly of a cylinder 47 provided at one end with a flange 48 clamped between the casing of the interlock valve device and a cover 49, said flange and cylinder separating the valve chamber 42 from a chamber 50 which is open to atmosphere through a port 51. A cup shaped piston 52 slidably mounted in the cover 49 has guidable contact with the exterior surface of cylinder 47 and is subject on one side to atmospheric pressure in chamber 50 and on the opposite side to pressure of fluid in a chamber 53 which is open through a passage 54 to an actuating pipe 55. The pipe 55 is connected to the independent brake valve device 7 and extends from end to end of the locomotive for connection with a corresponding pipe on another locomotive or locomotive unit when double or multiple heading. The piston 52 is of greater diameter than piston 46 and when subjected to pressure of fluid in chamber 53 is adapted to act through the piston 46 and stem 45 for moving the slide valve 41 to a release position, to be later described. Upon release of fluid pressure from chamber 53 the pressure of fluid in valve chamber 42 acting on piston 46 will actuate said piston to move the slide valve 41 to the normal position in which it is shown in the drawing.

The structure embodying the cylinder 47, flange 48, piston 46 and piston 52 constitutes the subject matter of an application of Robert E. Watson, Serial No. 749,677, filed May 22, 1947, and assigned to the assignee of the present application, and is not a part of the present invention.

The interlock valve device 9 further comprises an independent release valve device 20. The independent release valve device 20 comprises a release valve 21 contained in a chamber 56 which is connected by a passage 57 to the annular cavity 32 around the double check valve 18 and thence through a passage 58 to pipe 3 leading to the fluid pressure relay valve device 2. A spring 59 contained in chamber 56 acts on the release valve 21 for urging it into contact with a seat 60 for closing a brake release communication between said chamber and a passage 61 encircled at one end by said seat and opening at the opposite end to a chamber 62 which is open to atmosphere through a passage 63.

The release valve device further comprises a flexible diaphragm 64 arranged in coaxial relation to the valve 21 and subject on one side to pressure of fluid in a control chamber 65 which is connected by a passage 66 to the seat of the selector slide valve 41. At the opposite side of diaphragm 64 is a pressure chamber 67 connected by a passage 68 to the seat of slide valve 41 and also connected to passage 66 through a choke 69. A follower 70 disposed in chamber 67 in engagement with the diaphragm 64 has a stem 71 extending through said chamber and a wall 72 into chamber 62 and thence through passage 61 for engagement with the release valve 21, said stem being of smaller diameter than said passage. A spring 73 contained in chamber 67 and acting on the follower 70 is arranged to normally urge said follower and the diaphragm 64 to the position in which they are shown in the drawing defined by contact with a stop 74 in the casing. In this position of the stem 71 it is spaced from the release valve 21 to permit seating thereof by spring 59. Upon supply of fluid under pressure to chamber 65, in a manner to be later described, the diaphragm 64 is adapted to deflect and move the follower 70 and stem 71 against spring 73 into contact with the release valve 21 and then upon further movement unseat said valve from the seat 60. A sealing ring 75 carried by the stem 71 in the wall 72 has sealing and sliding contact with the bore therein for preventing leakage of fluid under pressure from chamber 67 to chamber 62 and thence to atmosphere.

Passages 16, 34 and 36 in the interlock valve device also extend to the seat of the selector slide valve 41 as well as a passage 76 which is connected through the pipe bracket 19 of the brake controlling valve device 1 to an application and release pipe 77 leading to the independent brake valve device 7. The application and release pipe 77 also extends to opposite ends of the locomotive for connection with the corresponding pipe on another locomotive or locomotive unit in case of double or multiple heading.

Since the independent brake valve device 7 is the same as disclosed in the aforementioned Hewitt patent the following description thereof will be limited to only that deemed essential to a clear understanding of the invention.

The independent brake valve device 2 is provided for controlling the brakes on the locomotive independently of the brakes on the cars in a train and comprises a casing in which there is disposed a spindle 78 which is rotatable by a handle 79 for controlling operation of a self-lapping application and release valve mechanism 80 and of a cut-off valve 81, while a lock-out valve mechanism 82 is provided in said casing for control by said handle in all positions thereof, independently of movement of said spindle. A pivot pin 83 connected to a sleeve 84 having driving engagement with spindle 78 is provided to permit vertical movement of handle 79 relative to said spindle. A spring 85 contained in the sleeve 84 acts on the handle 79 for turning it about the pin 83 to a normal elevated position, in which it is shown in the drawing, and for opposing downward manual movement of said handle.

As viewed in Figs 2 and 3 of the drawing, the brake valve handle 79 is provided with a locking position to the extreme left, a release position to the immediate right thereof and in which the handle is normally carried (Fig. 2) and an application and release zone extending toward the right-hand from the release position.

The self-lapping application and release valve mechanism 80 comprises an application valve 86 for controlling communication between a chamber 87 in which the spindle 78 is disposed and a passage 88 which is connected to a fluid pressure supply pipe 89. The valve 86 is carried by a plunger 90 slidably mounted in a suitable bore in the casing and containing a spring 91 acting on said plunger for urging said valve to its seated position.

A lapping piston 92 is slidably mounted in a suitable bore in the casing and is open at one side to chamber 87 and at the opposite side to a chamber 93 which is in permanent communication with atmosphere through a passage 94 and which contains an adjustable control spring 95 acting on the piston 92 for urging it in the direction of chamber 87.

The lapping piston 92 is provided axially with a chamber 96 open to chamber 87 and containing a release valve 97 for controlling communication between chamber 87 and the atmospheric chamber 93. The release valve 97 is provided with a stem the outer end of which slidably extends through a suitable opening in an element 98 secured to the left-hand face of the piston 92. An annular collar 99 is provided on the release valve stem at the right-hand side of element 98 for engagement therewith to limit unseating movement of the release valve relative to the piston 92, and a spring 100 provided in said piston acts on said collar for urging said valve to its open position.

A plunger 101 contained in chamber 87 has one end slidably mounted in a suitable casing bore arranged parallel to and intermediate the axes of the application valve 86 and release valve 97. The opposite end of plunger 101 is disposed in operative alignment with a cam 102 carried by the brake valve spindle 78. A rocking beam 103 is pivotally connected intermediate its ends to the plunger 101. In one end of this beam there is provided a roller 104 for engaging the end of the release valve stem, while pivotally connected to the other end is one end of a pin 105 the other end of which engages the application valve 86 within a suitable axial recess.

The cam 102 is arranged to urge the plunger 101 outwardly, that is toward the right-hand as viewed in the drawing, upon movement of the handle 79 from its release position into the application and release zone and to permit return of said plunger to the position in which it is shown in the drawing upon return of said handle to release position, the degree of movement of said plunger from the position shown in the drawing depending upon the distance the handle is moved from release position. The operating surface of the cam 102 is of constant radius between the release and locking positions of the handle 79 so that upon movement between these positions the plunger 102 will remain stationary.

A cam 106 is associated with the cam 102 for controlling operation of the cut-off valve 81. The cut-off valve 81 is contained in a chamber 107 open to the application and release pipe 77 and is provided with a fluted stem 108 slidably mounted in a suitable bore connecting chamber 107 to chamber 87 and extending through said bore into the latter chamber into operative alignment with the cam 106. A spring 109 in chamber 107 acts on the valve 81 for urging it to its seat. The cam 106 is so designed as to permit seating of the valve 81 in the locking position of handle 79 but to effect unseating of said valve upon movement of said handle to release position and to maintain said valve unseated in the application and release zone, as will be clear from an inspection of Fig. 3 of the drawing.

The lockout valve mechanism 82 comprises two oppositely seating valves 110 and 111 disposed in chambers 112 and 113, respectively, and provided with oppositely extending fluted stems which engage each other in an intermediate chamber 114. The chamber 112 is connected to the fluid pressure supply pipe 89 and contains a spring 115 for seating the valve 110 and for at the same time unseating valve 111. The chamber 113 is open to atmosphere through a passage 116, while the intermediate chamber 114 is connected to the actuating pipe 55.

The brake valve device further comprises a substantially semi-circular bail 117 pivoted on a pin 118 and having a portion disposed over the axes of the valves 110 and 111. Interposed between the valve 111 and the bail 117 is a spring seat 119 engaging said valve, a plunger 120 engaging said bail and a pair of interposed springs 121 and 122 arranged in tandem. With the handle 79 supported in its elevated position by spring 85 the springs 121 and 122 will be sufficiently extended to permit closing of valve 110 and opening of valve 111 by spring 115, but upon depressing of the handle 79 against the spring 85 the pressure of springs 121 and 122 will be increased to a degree exceeding that of spring 115 so as to close valve 111 and open valve 110.

A removable handle guard 123 is secured to the top of the brake valve casing and is provided in one side with an opening 124 extending circumferentially thereof in which the brake valve handle 79 is adapted to move to its different positions, the length of this opening being sufficient to permit such movement.

The upper edge of this opening 124 against which the handle 79 is normally forced into engagement by spring 85 is however formed at three different levels, there being a portion 125 and to the left thereof two successive downward steps 126 and 127. The portion 125 is coextensive with the application and release zone and is of such length as to permit the handle 79 to be held in its raised position by spring 85 in the release position thereof and in the application and release zone. In order to move the handle to the left from release position to the locking position defined by step 127, it must be depressed a certain amount in order to move in under the step 126 and then it must be further depressed to move in under the step 127. It will be noted that upon release of manual pressure on the handle 79 the spring 85 will urge said handle into engagement with the step 127 which is made concave to receive said handle and thus prevent said handle slipping out of said position.

Upon movement of the handle 79 from release position to locking position, the downward movement thereof and of bail 117 will act to seat valve 111 and open valve 110, while the cam 106 will be so positioned as to permit closure of valve 81 by spring 109. In all other positions of the brake valve handle 79 the valve 81 will be opened by cam 106. It will be noted that in the release position and in the application and release zone the handle 79 may also be depressed for closing valve 111 and opening valve 110 but the cut-off valve 81 will remain open during such operation.

The double heading cock 8 controls communication between the independent brake valve device 7 and the actuating pipe 55 and application and release pipe 77. This cock is carried in open position for establishing communication between the independent brake valve device and these pipes on the control locomotive in double or multiple heading, and when only a single locomotive is connected to control a train. On all locomotives except the control locomotive in double or multiple heading the double heading cock 8 is however moved to a closed position for disconnecting the application and release pipe 77 and the actuating pipe 55 from the respective independent brake valve device.

Operation

In operation, let it be initially assumed that the engineer desires the brakes on the locomotive to operate in unison with those on a connected train, as controlled through the medium of either the straight air pipe 15 or the brake pipe 13. To accomplish this the handle 79 of the independent brake valve device 7 will occupy its elevated release position in which it is shown in the drawing for opening the application and release pipe 77 to atmosphere past the open cut-off valve 81, chamber 87 and exhaust valve 97, and for at the same time opening the actuating pipe 55 to atmosphere past the open valve 111. With the actuating pipe 55 and thereby piston chamber 53 in the interlock valve device 40 open to atmosphere pressure of fluid in slide valve chamber 42 of the selector valve device acting on piston 46 will actuate said piston and the piston 52 to the position in which they are shown in the drawing for correspondingly positioning the said selector slide valve 41. With the slide valve 41 in this position chamber 65 above diaphragm 64 in the release valve device 54 will be open to atmosphere through passage 66, a cavity 128 in said slide valve and an atmospheric port 129, while chamber 67 below said diaphragm will also be vented by way of passage 68, choke 69 and the vented passage 66. With the opposite sides of diaphragm 64 thus both subject to atmospheric pressure spring 73 will elevate the diaphragm 64 to the position in which it is shown in the drawing for thereby drawing stem 71 away from the release valve 21 to permit closing of said valve by spring 59. With the selector slide valve 41 in the normal position just described the upper end of the double check valve 18 will be open to atmosphere through passage 36, a cavity 130 in said slide valve, passage 76 and the vented application and release pipe 77, while the upper end of the double check valve 17 will be connected to the straight air pipe 15 by way of passage 34, a cavity 131 in the selector slide valve 41 and the passage 16.

Now let it be assumed that the operator desires to apply the brakes on the locomotive through the medium of the straight air pipe 15 in unison with the brakes on a train also controlled through said pipe. To accomplish this he will supply fluid under pressure to the straight air pipe 15 from whence it will flow through passage 16 to the seat of the selector slide valve 41 and then through cavity 131 in said slide valve to passage 34 leading to the upper end of the double check valve 17. At this time passage 14 connected to the lower end of the double check valve 17 will be open to atmosphere through the brake controlling valve device 1 as a result of which pressure of fluid from passage 34 will shift the double check valve 17 to its lower position to close communication between the respective annular cavity 32 and passage 14 and open said cavity to passage 34. Fluid under pressure from passage 34 will then flow through cavity 32 around the double check valve 17, and passages 39, 38 and 37 to the lower end of the double check valve 18. The upper end of the double check valve device 18 is at this time vented through passage 36, cavity 130 in the selector slide valve 41, passage 76 and the independent application and release pipe 77, so that fluid pressure from the straight air pipe acting on the lower end of the double check valve 17 will shift said valve to its upper position to close communication between passage 36 and the respective annular cavity 32 and open said cavity 32 to passage 37 whereupon fluid from the straight air pipe in passage 37 will flow to said cavity 32 and thence through passage 58 and pipe 3 to the relay valve device 2 for effecting operation thereof to supply fluid under pressure to the brake cylinder device 4 for applying the brakes on the locomotive.

In order to release a straight air application of brakes on the locomotive in unison with the release of a straight air application of brakes on cars of a train, fluid under pressure will be released from the straight air pipe 15, whereupon fluid will be released from the fluid pressure relay valve device 2 back through the communication just described to said straight air pipe for permitting operation of said relay valve device to release fluid under pressure from the brake cylinder device 4 for releasing the brakes on the locomotive.

Now let it be assumed that through the medium of the brake pipe 13 the engineer desires that the brakes on the locomotive operate in unison with those on the train. Upon a reduction in brake pipe pressure fluid under pressure will be supplied by operation of either the service application valve device 11 or said device and the emergency valve device 12, depending upon whether the reduction is at a service or emergency rate, to passage 14 leading to the lower end of the double check valve 17. At this time the upper end of the double check valve 17 will be vented through the straight air pipe 15, as a result of which, said check valve will shift to its upper position to permit fluid from passage 14 to flow to the respective annular cavity 32 and then through passages 39, 38 and 37 to the lower end of the double check valve 18. With the upper end of the double check valve 18 vented to atmosphere at this time through the independent application and release pipe 77, the double check valve 18 will be shifted to its upper position to permit flow of fluid from passage 37 to the respective annular cavity 32 and thence to passage 58 connected through pipe 3 to the relay valve device 2. The relay valve device 2 will thereby be operated to supply fluid to the brake cylinder device 4 at a pressure corresponding to the reduction in pressure in the brake pipe 13. Upon recharging of the brake pipe 13 and opening of passage 14 to atmosphere through the service application valve device 11, in the usual manner, fluid pressure will be released from the relay valve device 2 to permit operation thereof to release the brakes on the locomotive.

It will now be seen that with the independent brake valve handle 79 in its normal release position, in which it is shown in the drawing, the brakes on the locomotive can be controlled either through the medium of the straight air pipe 15 or the brake pipe 13 in unison with the control of brakes on cars of a connected train. It will also be noted that regardless of the type of control, fluid under pressure supplied to passage 58 for flow to the relay valve device 2 for effecting operation thereof also flows from the annular cavity 32 around the double check valve 18 through passage 57 to the release valve chamber 56 in the independent release valve device 54 but the valve 21 in said chamber is at this time positively seated by spring 59 to prevent release of such pressure under these conditions.

With the straight air pipe 15 vented to atmosphere and the brake pipe 13 fully charged, under which condition the brakes on the locomotive will be released, if the operator desires to apply the brakes on the locomotive independently of those on the train he will operate the handle 79, without depressing it, from the release position into the application and release zone. This operation will displace the plunger 101 so as to rock the lever 103 first in a clockwise direction about its connection with the application valve operating stem 105 for seating the release valve 97, following which, the supply valve 86 will be opened, this sequence of operation being obtained since the pressure of spring 100 on the release valve is less than that of spring 91 acting on the supply valve. Upon opening of the supply valve 86 fluid under pressure supplied thereto from the supply pipe 89 will flow past said valve into chamber 87 and thence past the open cut-off valve 81 to the application and release pipe 77.

Fluid under pressure thus supplied to the application and release pipe 77 will flow to passage 76 in the interlock valve device 9 and thence through cavity 130 in the selector slide valve 41 to passage 36 leading to the upper end of the double check valve device 16. The lower end of the double check valve 18 will at this time be open through passages 37, 38 and 39 and the double check valve 17 to atmosphere either by way of passage 34 which is open to the straight air pipe 13 or by way of passage 14 in the brake controlling valve device 1 which is in its release position. As a result, the pressure of fluid supplied by the independent brake valve device to passage 36 will shift the double check valve 18 to its lower seated position whereupon fluid from said passage will flow to the respective annular cavity 32 and thence through passage 58 and pipe 3 to the relay valve device 2. The relay valve device 2 will then operate to supply fluid at a corresponding pressure to the brake cylinder device 4 for applying the brakes on the locomotive independently of the straight air pipe 15 and of the brake pipe 13 and thus independently of the brakes on the train.

The self-lapping application and release valve mechanism 80 is operative to vary the pressure of fluid provided in the relay valve device 2 and thereby the degree of brake application on the locomotive in accordance with the position of the independent brake cylinder handle 79 in the application and release zone, in a manner which is well understood and which need not be described here in detail, it being merely desired to point out that upon return of the brake valve handle 79 to its release position the cam 102 will be so positioned as to permit closure of the supply valve 86 and opening of the release valve 77 for releasing fluid under pressure from the relay valve device 2 and thereby from the brake cylinder device 4 for releasing the locomotive brake.

Now let it be assumed that the engineer desires to prevent the locomotive brakes from applying at the time of effecting an application of brakes on the train by either supplying fluid under pressure to the straight air pipe 15 or reducing the pressure in the brake pipe 13. To accomplish this he will merely depress the handle 79 from its release position and thereby close valve 111 and open valve 110 to supply fluid under pressure to the actuating pipe 55 and thence to piston chamber 53 in the selector valve device 40, it being noted that the cut-off valve 81 in the independent brake valve device is still open connecting the application and release pipe 77 to atmosphere.

When fluid under pressure is supplied to piston chamber 53 in the selector valve device 40 as just described, such pressure acting on piston 52 will overcome the opposing force of pressure of fluid in valve chamber 42 acting on piston 46 and move said pistons and thereby the slide valve to release position in which passage 66 is disconnected from the atmospheric passage 129 and opened through a port 132 in said slide valve to the valve chamber 42, whereupon fluid at main reservoir pressure from said valve chamber will become effective in chamber 65 above the diaphragm 64. Chamber 67 below the diaphragm 64 will at the same time be opened to atmosphere through passage 69, cavity 130 in the selector slide valve 41 to passage 76 in turn connected to the vented application and release pipe 77. A portion of the fluid supplied from the selector valve chamber 43 to passage 66 will flow through the choke 69 to passage 68, but will be dissipated through the application and release pipe 77 at this time, so that the pressure of fluid in diaphragm chamber 67 will be reduced to substantially that of atmosphere and permit pressure of fluid in chamber 65 to deflect the diaphragm 64 downwardly for operating the stem 71 to open the release valve 21.

In this upper position of the selector slide valve 41 communication between passage 16 connected to the straight air pipe 15 and passage 34 will be closed so as to positively prevent supply of fluid under pressure to the latter passage for effecting an application of brakes on the locomotive when fluid under pressure is supplied to the straight air pipe 15 for applying the brakes on the train. However, if the pressure of fluid in the brake pipe 13 is reduced for effecting an automatic application of brakes on the train, the brake controlling valve device 1 will operate in the usual way to supply fluid under pressure to passage 14 through which it will flow to the double check valve 17 and thence through passages 39, 38 and 37 leading to the double check valve device 18 which will move to its upper position for opening communication between passage 37 and passages 58 and 57 leading respectively to the relay valve device 2 and independent release valve chamber 56. With the independent release valve 21 open the fluid supplied by the brake controlling valve device 1 on the locomotive to passages 58 and 57 will therefore be dissipated to atmosphere and prevent operation of the relay valve device 2 to apply the locomotive brake, whereby the brakes on the locomotive will be held off while the brakes on the train are being applied.

With this type of equipment the brakes on a train are usually controlled by straight air through the medium of the straight air pipe 15 and the operator may desire to permanently prevent the brakes on the locomotive from applying at the time the brakes on the train are applied by straight air, but at the same time, for the safety of the train, ensure that the brakes in the locomotive will apply automatically in case of a reduction in brake pipe pressure due for instance to a break in two of the train. To accomplish this, the engineer will depress the handle 79 and move it to its locking position wherein the selector valve device 40 will move to its upper position as just described and the cut-off valve 81 in the independent brake valve device will be seated thereby closing the atmospheric connection to the application and release pipe 77. With the application and release pipe 77 disconnected from atmosphere by the independent brake valve device as just described, the supply of fluid under pressure to said pipe by way of choke 69, passage 68, cavity 130 in slide valve 41 and passage 76 will increase the pressure therein and in said passages and thus in diaphragm chamber 67 of the independent release valve device 54 to the same degree as effective in chamber 65 at the opposite side of the diaphragm 64 whereupon spring 73 will deflect said diaphragm to the position in which it is shown in the drawing to permit closure of the release valve 21.

With the equipment thus conditioned a straight air application of brakes on the locomotive upon supply of fluid under pressure to the straight air pipe 15 for applying the brakes on a train will be prevented for the same reasons as hereinbefore described, but in case of a reduction in pressure in the brake pipe 13 the fluid under pressure supplied by the consequent operation of the brake controlling valve device 1 to passage 14 will be prevented from escape to atmosphere since the independent release valve 21 is seated, as a result of which the brakes on the locomotive will be positively applied.

Now let it be assumed that with handle 79 of the independent brake valve device in its elevated release position, that the brakes on the locomotive have been applied along with the brakes on the train, either through the medium of supplying fluid under pressure to the straight air pipe 15 or reducing the pressure in the brake pipe 13, and that the engineer desires to release the brakes on the locomotive independently of those on the train. To effect this he will depress the handle 79 from its release position and thereby close the valve 111 and open the valve 110 in the lockout valve mechanism 82, and as a result supply fluid under pressure to piston chamber 53 in the selector valve device 40 and actuate said device to its upper position for supplying fluid under pressure to diaphragm chamber 65 in the independent release valve device 20 and for at the same time opening chamber 67 at the opposite side of diaphragm 64 to atmosphere through cavity 139 in the slide valve 41 and thence through pipe 76 and the application and release pipe 77 which is vented past the open cut-off valve 81 in the independent brake valve device. As a result of venting the fluid under pressure from diaphragm chamber 67 in the independent release valve device 20 the main reservoir pressure provided in diaphragm chamber 65 will deflect said diaphragm and open the release valve 21 for thereby releasing fluid under pressure from passage 57 and the connected relay valve device 2 for permitting operation of said relay valve device 2 to effect a release of fluid under pressure from the brake cylinder device 4 for releasing the locomotive brake.

It will be noted that in effecting an independent release of the brakes on the locomotive, as just described, there will be a slight flow of fluid under pressure through the choke 69 to the application and release pipe 77 which is vented to atmosphere through the independent brake valve device, the same as occurs in preventing an application of locomotive brakes at the time the brakes on the train are applied, but this flow is restricted to such a degree that even on a plurality of connected locomotives, such as four or five, such flow at each locomotive to the application and release pipe 77 will not increase the pressure therein to any material degree against the single exhaust past the cut-off valve 81 in the independent brake valve device on the control locomotive, whereby the pressure of fluid in diaphragm chamber 65 of the release valve device on the one or more locomotives will positively hold the release valve 21 open to either prevent the application of locomotive brakes or to insure a complete and positive release of an application of locomotive brakes, as the case may be, and as desired. The only purpose of choke 69 is for charging the application and release pipe when the independent brake valve handle 25 is in locking position so as to obtain the pressure required in diaphragm chamber 67 on either one or several connected locomotives for insuring positive closing of the independent release valve 21 for the reasons above described.

In the release position of the selector slide valve 41 it will be noted that the passages 34 and 36 are open through cavity 131 to an atmospheric passage 133. The purpose of this is to insure that the pressure in these passages will be atmospheric at a time when an automatic application of brakes is effected with the independent brake valve device 79 in the locking position, so that the double check valve devices 17 and 18 will remain in their upper position to permit the release of such an application upon a subsequent increase in pressure in the brake pipe 13 and consequent operation of the brake controlling valve device 1. If these passages 34 and 36 were not vented under this condition, leakage of fluid under pressure past the double check valves into said passages while the brakes were applied might, upon opening of passage 14 to atmosphere through the brake application valve device 1 upon a subsequent increase in brake pipe pressure, permit the bottled pressure of fluid in either one of said passages to shift the respective double check valve 17 or 18 to its opposite seated position from that occupied when an automatic application of brakes is effected, and thus prevent release of such an application.

*Summary*

From the above description it will now be seen that I have provided a release valve device for preventing an application of brakes on the locomotive or for releasing an application, independently of the brakes on the train. The independent release valve device controls a local brake release communication from the fluid pressure relay valve device and is controlled by positive opposing forces to insure positive and prompt conditioning thereof in response to operation of the independent brake valve device on the respective locomotive, or on the control locomotive in multiple or double heading. Further, the selector valve device is so constructed as to positively assure the release of an automatic application of brakes on the locomotive by operation of the brake controlling valve device thereon in response to an increase in brake pipe pressure with the independent brake valve handle 79 in locking position. In locking position of the brake valve handle a choke in the selector valve device provides for charging of the application and release pipe as required to condition the independent release valve to permit seating of the release valve 21. Where a plurality of locomotives are connected together for operation in multiple the choke on each locomotive will be effective to charge the application and release pipe, but these chokes are of such small flow capacity as to have no material effect upon operation of the several independent release valve devices on the locomotives in response to operation of the operator's independent brake valve handle 79.

Having now described the invention, what I claim as new and desire to secure by Letters Patent, is:

1. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means controlled by opposing pressure of fluid in two chambers for controlling said release valve, and means including an engineer's independent brake valve device for controlling the pressure of fluid in said chambers.

2. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means operable upon supply of fluid under pressure to one chamber to operate said release valve to open said communication, means for operating said release valve to close said communication upon substantial equalization of pressure of fluid in said one chamber with pressure of fluid in another chamber, and means including an engineer's brake valve device for controlling the pressure of fluid in said one and other chambers.

3. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means operable upon supply of fluid under pressure to one chamber to operate said release valve to open said communication, means for operating said release valve to close said communication upon substantial equalization of pressure of fluid in said one chamber with pressure of fluid in another chamber, an actuating pipe adapted to be connected between locomotives, an application and release pipe adapted to be connected between locomotives, a selector valve movable to a normal position upon release of fluid under pressure from said actuating pipe to open said chambers to atmosphere and movable to a release position upon supply of fluid under pressure to said actuating pipe to supply fluid under pressure to said chambers, and to connect said other chamber to said application and release pipe, means for restricting the supply of fluid under pressure to said other chamber and the connected application and release pipe with respect to the supply of fluid under pressure to said one chamber, and an engineer's independent brake valve device for selectively supplying fluid under pressure to and releasing fluid under pressure from said actuating pipe and for selectively opening and closing communication between said application and release pipe and atmosphere.

4. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means operable upon supply of fluid under pressure to one chamber to operate said release valve to open said communication, means for operating said release valve to close said communication upon substantial equalization of pressure of fluid in said one chamber with pressure of fluid in another chamber, an actuating pipe adapted to be connected between locomotives, an application and release pipe adapted to be connected between locomotives, a selector valve movable to a normal position upon release of fluid under pressure from said actuating pipe to open said chambers to atmosphere and movable to a release position upon supply of fluid under pressure to said actuating pipe to supply fluid under pressure to said chambers, and to connect said other chamber to said application and release pipe, means for restricting the supply of fluid under pressure to said other chamber and the connected application and release pipe with respect to the supply of fluid under pressure to said one chamber, and an engineer's independent brake valve device for opening said application and release pipe to atmosphere and for at the same time selectively supplying fluid under pressure to or releasing fluid under pressure from said actuating pipe.

5. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means operable upon supply of fluid under pressure to one chamber to operate said release valve to open said communication, means for operating said release valve to close said communication upon substantial equalization of pressure of fluid in said one chamber with pressure of fluid in another chamber, an actuating pipe adapted to be connected between locomotives, an application and release pipe adapted to be connected between locomotives, a selector valve movable to a normal position upon release of fluid under pressure from said actuating pipe to open said chambers to atmosphere and to connect said application and release pipe to said brake means and movable to a release position upon supply of fluid under pressure to said actuating pipe to supply fluid under pressure to said chambers and to disconnect said application and release pipe from said brake means and open same to said other chamber, means for restricting supply of fluid under pressure by said selector valve to said other chamber and the connected application and release pipe with respect to the supply of fluid under pressure to said one chamber, and an engineer's independent brake valve device for selectively supplying fluid under pressure to and for releasing fluid under pressure from said actuating pipe and for selectively opening and closing communication between said application and release pipe and atmosphere.

6. In a locomotive fluid pressure brake equipment, the combination with brake means operable by fluid under pressure to effect an application of locomotive brakes and upon release of such fluid under pressure a release of locomotive brakes, brake control means for supplying and releasing fluid under pressure to and from said brake means, a communication for releasing fluid under pressure from said brake means independent of said brake control means, a release valve for opening and closing said communication, movable abutment means operable upon supply of fluid under pressure to one chamber to operate said release valve to open said communication, means for operating said release valve to close said communication upon substantial equalization of pressure of fluid in said one chamber with pressure of fluid in another chamber, an actuating pipe adapted to be connected between locomotives, an application and release pipe adapted to be connected between locomotives, a selector valve movable to a normal position upon release of fluid under pressure from said actuating pipe to open said chambers to atmosphere and to connect said application and release pipe to said brake means and movable to a release position upon supply of fluid under pressure to said actuating pipe to supply fluid under pressure to said chambers and to disconnect said application and release pipe from said brake means and open same to said other chamber, means for restricting supply of fluid under pressure by said selector valve to said other chamber and the connected application and release pipe with respect to the supply of fluid under pressure to said one chamber, and an engineer's independent brake valve device comprising one valve means for selectively supplying fluid under pressure to and for releasing fluid under pressure from said actuating pipe, another valve means for selectively opening and closing communication between said application and release pipe and atmosphere, an operator's control handle, and means operative by said handle for selectively controlling said one and other valve means.

7. In a locomotive fluid pressure brake equipment, the combination with brake means operable by fluid under pressure to effect an application of locomotive brakes and upon release of such fluid under pressure a release of locomotive brakes, a communication for conveying fluid under pressure to and from said brake means, a release valve having a release position for opening said communication to atmosphere and having a normal position for disconnecting said communication from atmosphere, movable abutment means operable by fluid under pressure in one chamber to move said release valve to said release position, means for moving said release valve to said normal position upon substantial equalization of fluid pressures in said one chamber and in another chamber, a selector valve having one position for equalizing the fluid pressures in said one and other chambers and another position for supplying fluid under pressure to said one chamber, and an engineer's independent brake valve device cooperative with said selector valve in its said other position to either provide fluid under pressure in said other chamber or to release fluid under pressure therefrom.

8. In a locomotive fluid pressure brake equipment, the combination with brake means operable by fluid under pressure to effect an application of locomotive brakes and upon release of such fluid under pressure, a release of locomotive brakes, a brake pipe, brake control means operable upon a reduction in pressure in said brake pipe to supply fluid under pressure to a communication leading to said brake means, a release valve having a brake release position for opening said communication to atmosphere and having a normal position for disconnecting said communication from atmosphere; a movable abutment operable upon supply of fluid under pressure to one chamber to move said release valve to said release position, means for moving said release valve to said normal position upon substantial equalization of pressures in said one chamber and in another chamber, an application and release pipe adapted to be connected between locomotives, an actuating pipe adapted to be connected between locomotives, a selector valve having a normal position for equalizing opposing fluid pressures on said abutment and for establishing a connection for flow of fluid under pressure between said application and release pipe and a passage and having a brake release position for closing said connection and for opening said passage to atmosphere and for also supplying fluid under pressure to said chambers and for connecting said other chamber to said application and release pipe, means for restricting the supply of fluid under pressure to said other chamber and application and release pipe in said brake release position of said selector valve, a double check valve open at opposite ends to said brake control means and passage for selectively controlling communication therebetween and the first named communication, and an engineer's independent brake valve device for selectively supplying fluid under pressure to and releasing fluid under pressure from each of said pipes and for also closing communication between said application and release pipe and atmosphere.

9. In a locomotive fluid pressure brake equipment, the combination with brake means operable upon supply of fluid under pressure to a passage to effect an application of locomotive brakes and upon release of fluid under pressure from said passage a release of locomotive brakes, a straight air pipe for conveying fluid under pressure to and from said passage, a brake pipe, brake control means operable upon a reduction and increase in pressure in said brake pipe for, respectively, supplying fluid under pressure to and releasing fluid under pressure from said passage, an application and release pipe, an engineer's independent brake valve device for supplying and releasing fluid under pressure to and from said passage by way of said pipe, a double check valve open at opposite ends to said straight air pipe and brake control means for selectively closing communication therebetween and a second passage, another double check valve open at opposite ends to said second passage and said application and release pipe for selectively closing communication therebetween and the first named passage, a selector valve having a normal position for opening said straight air pipe and application and release pipe to the respective ends of said double check valves and another position for disconnecting same from said double check valves and for opening said respective ends to atmosphere, and means for controlling said selector valve.

10. In a locomotive fluid pressure brake equipment, the combination with brake means operable upon supply of fluid under pressure to a passage to effect an application of locomotive brakes and upon release of fluid under pressure from said passage a release of locomotive brakes, a straight air pipe for conveying fluid under pressure to and from said passage, a brake pipe, brake control means operable upon a reduction and increase in pressure in said brake pipe for, respectively, supplying fluid under pressure to and releasing fluid under pressure from said passage, an application and release pipe, an engineer's independent brake valve device for supplying and releasing fluid under pressure to and from said passage by way of said pipe, a double check valve open at opposite ends to said straight air pipe and brake control means for selectively closing communication therebetween and a second passage, another double check valve open at opposite ends to said second passage and said application and release pipe for selectively closing communication therebetween and the first named passage, a selector valve having a normal position for opening said straight air pipe and application and release pipe to the respective ends of said double check valves and another position for disconnecting same from said double check valves and for opening said respective ends to atmosphere, an actuating pipe connected to said brake valve device, means operable upon supply of fluid under pressure to said actuating pipe to effect movement of said selector valve to its said other position and upon release of fluid under pressure from said actuating pipe to said normal position, a release valve having a normal position for closing an atmospheric connection to said first passage and a release position for opening such connection, movable abutment means operable upon supply of fluid under pressure to one chamber to move said release valve to said release position and upon substantial equalization of pressures of fluid in said one chamber and another chamber to effect movement of said release valve to said normal position, said selector valve in its normal position effecting equalization of fluid pressures in said one and other chambers and in its other position supplying fluid under pressure to both of said chambers and to said application and release pipe, and means for restricting the supply of fluid under pressure to said other chamber and application and release pipe with respect to the supply of fluid under pressure to said one chamber, said independent brake valve device being also operative with fluid under pressure released from said application and release pipe to close the connected end of such pipe.

ANDREW T. GORMAN.

REFERENCES CITED

The following references are of record in the file of this patent:

UNITED STATES PATENTS

| Number | Name | Date |
| --- | --- | --- |
| 2,173,937 | Farmer | Sept. 26, 1939 |
| 2,173,940 | Hewitt et al. | Sept. 26, 1939 |